United States Patent
Curtis

[15] 3,651,851
[45] Mar. 28, 1972

[54] FOLDING PEN CONSTRUCTION
[72] Inventor: Charles E. Curtis, Cave Springs, Ark.
[73] Assignee: Curtis Chick Service, Inc.
[22] Filed: July 21, 1970
[21] Appl. No.: 56,857

[52] U.S. Cl. ................................160/135, 119/20, 160/229, 160/351, 256/33
[51] Int. Cl. ................................A47g 5/00
[58] Field of Search ....................160/229, 135, 351; 256/25, 256/24, 33, 26; 119/20

[56] References Cited

UNITED STATES PATENTS

| | | | |
|---|---|---|---|
| 1,250,429 | 12/1917 | Carroll | 160/135 |
| 651,075 | 6/1900 | Huffman | 160/229 R X |
| 1,071,822 | 9/1913 | Storey | 256/33 UX |
| 1,182,018 | 5/1916 | Koenig | 256/25 |
| 2,275,942 | 3/1942 | Barry | 160/229 R UX |
| 2,835,223 | 5/1958 | Erickson | 119/20 |

Primary Examiner—David J. Williamowsky
Assistant Examiner—Philip C. Kannan
Attorney—Clarence A. O'Brien and Harvey B. Jacobson

[57] ABSTRACT

A folding wall assembly comprising a plurality of upright panel sections disposed in edge-to-edge relation and pivotally secured together along adjacent upstanding edge portions for relative horizontal swinging. The panel sections include upstanding rod portions defining the adjacent edge portions thereof and the latter are pivotally secured together by means of vertically spaced sleeve members through which both corresponding rod portions of the adjacent panels are loosely received. Each panel section is defined by a plurality of side-by-side upstanding rod members interconnected by a plurality of vertically spaced generally horizontal rod members crossing and secured to the vertical members and the corner portions of the panel sections are reinforced by vertical extensions of the vertical edge defining rod bent approximately 180° inwardly and back upon themselves and anchored to the adjacent horizontal rod member end portion.

3 Claims, 4 Drawing Figures

PATENTED MAR 28 1972 3,651,851

Charles E. Curtis
INVENTOR

BY Clarence A. O'Brien
and Harvey B. Jacobson
Attorneys

FOLDING PEN CONSTRUCTION

The folding pen construction of the instant invention is utilized, when unfolded, as a low portable partition or fence. Each assembly, when unfolded, is held by a "chicken catcher" in slightly spaced relation to above the ground and advanced in front of the "chicken catcher" supporting the assembly as that "chicken catcher," together with other "chicken catchers" also provided with a fence, advances through a poultry pen. The individual wall assemblies or fences carried by the "chicken catchers" are arranged in end-to-end relation to form an elongated wall structure which may be advanced through a poultry pen or the like toward one wall or corner portion thereof so as to concentrate the poultry within the pen against the wall or in the corner portion toward which the wall structure is advanced. Then, because each of the fences are of the accordion fold-type, the "chicken catchers" using the fences may each step around the ends of the fences and into the area in which the poultry have been concentrated after which the individual fences are left in free-standing position upon the ground or in position wired together and to the walls of the chicken house. The "chicken catchers" in the area within which the poultry have been concentrated may then readily catch the poultry as desired.

Although the prime purpose of the folding pen or wall assembly of the instant invention is to form a portable wall which may be readily advanced through a poultry pen or the like in order to concentrate the poultry in one small portion of the pen, the folding wall assembly may also find valuable uses in other environments.

The folding wall of pen assembly includes a plurality of panel sections, and each panel section is formed of grid of crossed vertical and horizontal rods. Adjacent edge portions of adjacent panel sections are joined together by means of sleeves spaced along the adjacent edge portions and through which the upstanding rods of the adjacent edge portions are loosely received.

Further, the upstanding edge rods include opposite end extensions which are bent inwardly approximately 180° and anchored to the ends of the adjacent horizontal rod members.

The main object of this invention is to provide a folding wall or pen assembly which may be readily handled by poultry farm workers and utilized to form a readily handled wall which may be advanced in front of the poultry farm workmen in order to concentrate poultry in one portion of a poultry pen.

Another object of this invention, in accordance with the immediately preceding object, is to provide a folding wall assembly which may be readily folded and stored in a compact state.

A still further object of this invention is to provide a folding wall assembly constructed in a manner whereby the wall assembly will be able to withstand considerable rough handling without breakage or the necessity of repair maintenance.

A final object of this invention to be specifically enumerated herein is to provide a folding wall assembly in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings the numeral 10 generally designates the folding wall assembly or pen construction of the instant invention. The assembly 10 includes four similar upstanding panel sections 12, 14, 16 and 18 which have adjacent upstanding edge portions hingedly connected by means of pivot sleeves 20.

Figure 4:
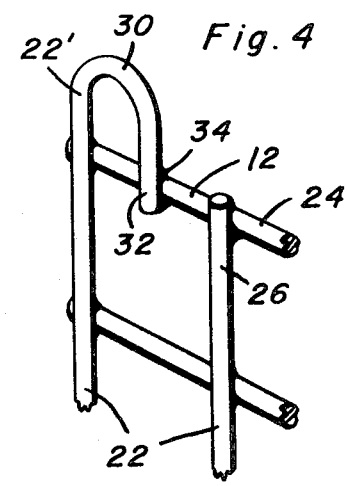
FIG. 4 is a fragmentary enlarged perspective view of one of the corner portions of one of the panel sections.

Each of the sections 12, 14, 16 and 18 includes a plurality of spaced side-by-side upstanding rods 22 interconnected by means of a plurality of vertically spaced horizontal rods 24 extending between and secured to the rods 22. The rods 20 and 22 are rigidly connected at each inner section by means of welding 26, see FIGS. 2 and 4 and each of the rods 22 defining a vertical edge of one of the sections 12, 14, 16 and 18 includes upper and lower end extensions 22' which include 180° bends 30 and terminal ends 32 secured as by welding 34 to the adjacent end of the corresponding horizontal rod 24.

Figure 1:
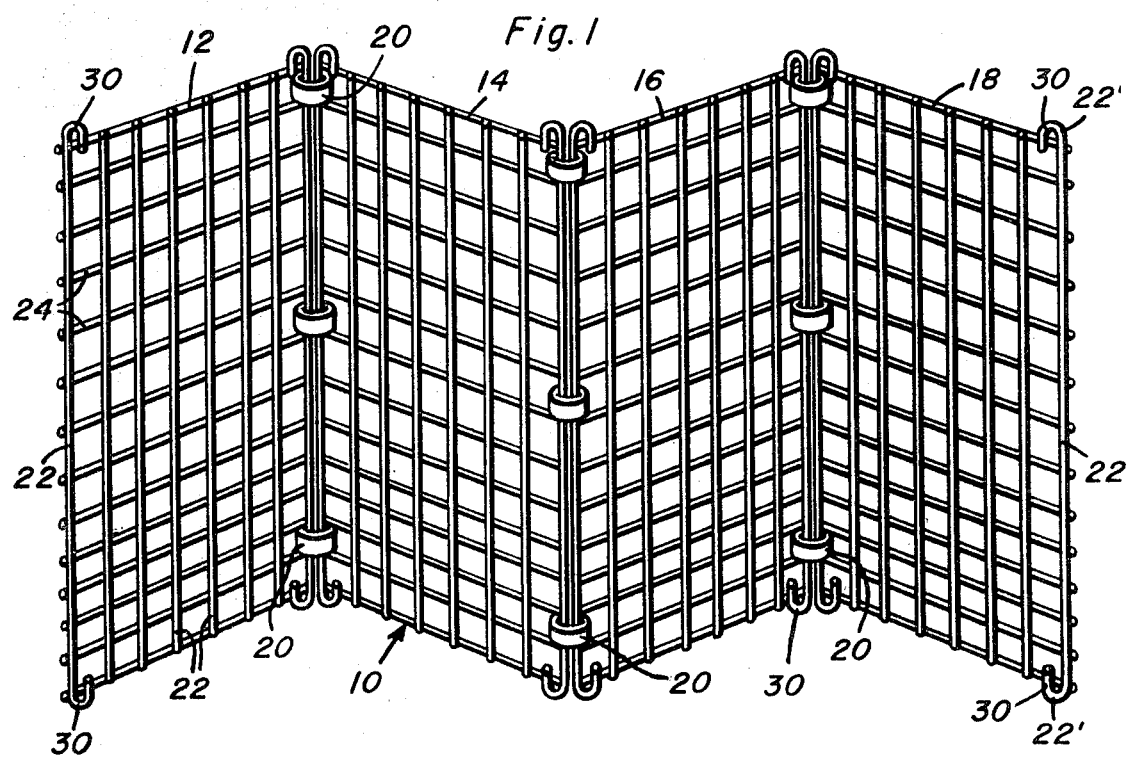
FIG. 1 is a perspective view of a folding wall assembly constructed in accordance with the present invention.
Figure 2:
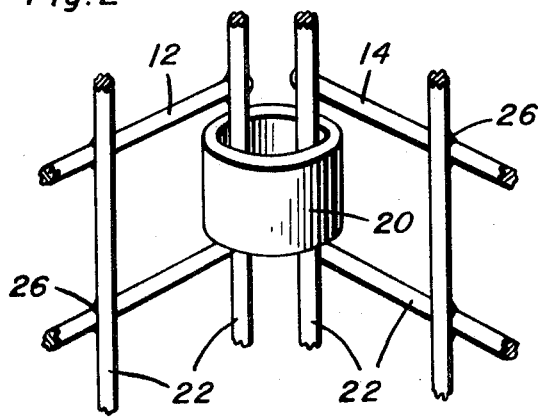
FIG. 2 is an enlarged fragmentary perspective view of adjacent upstanding edge portions of two of the panel sections of the wall assembly illustrating the manner in which sleeve members are utilized to pivotally secure adjacent panel sections together.
Figure 3:
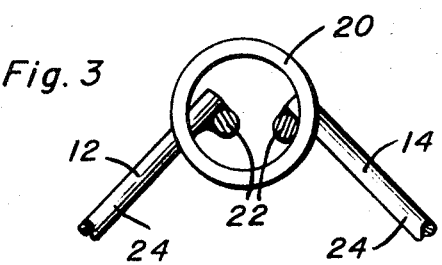
FIG. 3 is a horizontal sectional view taken substantially upon a plane disposed immediately above the connecting sleeve illustrated in FIG. 2.

As can best be seen from FIGS. 2 and 3 of the drawings, the sleeves 20 are substantially cylindrical and disposed between adjacent horizontal rods 24 of the associated sections. The sleeves 20 loosely receive the corresponding upstanding rods 22 therethrough and it will thus be appreciated that the folding wall assembly or pen construction may be readily collapsed or folded into position with all four of the panel sections disposed in intimate side-by-side relation.

By constructing the various sections 12, 14 16 and 18 of heavy gauge rod material and by utilizing relatively large diameter sleeves which include an inside diameter which is greater than four times the diameter of the corresponding upstanding rods 22, an extremely rigid accordion fold wall or pen construction is provided. In addition, since the wall assembly might be picked up and held with either set of rods 24 to which the extensions 22' are secured lowermost, both the upper and lower ends of the rods 22 defining the upstanding edges of the panels 12, 14, 16 and 18 include the extensions 22'. By curving the extensions 22' backwardly so as to parallel the rods 22 and by securing the back turned terminal ends 32 to the corresponding ends of the rods 24 by welding 34, the corner portions of the sections 12, 14, 16 and 18 are reinforced and provided with endwise rounded extensions which will slide more easily over the ground when the lower marginal edge portion of the folding wall assembly 10 is scraped along the ground as the wall 10 is advanced. Thus, the extension 22' as well as the sleeves 20 function to provide a device which will be able to withstand mis-use without incurring damage requiring repairs or replacement of one of the sections 12, 14, 16 and 18. Of course, any suitable rigid material may be utilized in constructing the sections 12, 14, 16 and 18. Further, any suitable rigid material may be utilized in forming the sleeve 20.

The various adjacent panel sections may be rotated relative to each other at least 360° and the sections may therefore be folded in either direction relative to the adjacent sections, thus eliminating the most common damage to existing similar devices when they are incorrectly folded for storage and or shipment in a flat condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A portable free standing upstanding barrier assembly including a plurality of upstanding panel sections each including upstanding opposite side edge portions, said panel sections being disposed in upstanding side edge-to-side edge relation, each panel section comprising a grid of crossed upstanding and horizontal elongated members secured to each other, the upper and lower ends of the upstanding elongated member at each side of each of said panel sections including an endwise extension smoothly bent inwardly toward the other side of the panel section and back toward the remote end of the panel section and secured to the adjacent horizontal member a spaced distance from that upstanding elongated member, and means joining adjacent side elongated members of adjacent panel sections to each other for relative swinging of said adjacent panel sections about upstanding axes.

2. The combination of claim 1 wherein said means comprises a plurality of vertically spaced sleeve members loosely receiving corresponding portions of said side upstanding elongated members therethrough.

3. The combination of claim 2 wherein said sleeve members are each retained captive on the corresponding upstanding elongated members between a pair of said horizontal members.

* * * * *